United States Patent
Jakobi et al.

(10) Patent No.: US 12,441,039 B2
(45) Date of Patent: Oct. 14, 2025

(54) METHOD AND DEVICE FOR PRODUCING MARBLED MOLDED PARTS AND METHOD FOR PRODUCING THE DEVICE

(71) Applicant: BASF SE, Ludwigshafen am Rhein (DE)

(72) Inventors: Reinhard Jakobi, Ludwigshafen (DE); Angelika Homes, Ludwigshafen (DE); Susanne Zeiher, Ludwigshafen (DE); Daniel Leutz, Ludwigshafen (DE); Natascha Manuela Meierhoefer, Ludwigshafen (DE); Rafael Gimenez Casat, Ludwigshafen (DE); Marcus Imo, Ludwigshafen (DE); Sascha Tim Schwendy, Ludwigshafen (DE); Leonhard Ullrich, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 346 days.

(21) Appl. No.: 17/768,500

(22) PCT Filed: Oct. 13, 2020

(86) PCT No.: PCT/EP2020/078776
§ 371 (c)(1),
(2) Date: Apr. 13, 2022

(87) PCT Pub. No.: WO2021/074150
PCT Pub. Date: Apr. 22, 2021

(65) Prior Publication Data
US 2024/0092000 A1    Mar. 21, 2024

(30) Foreign Application Priority Data

Oct. 15, 2019 (EP) ...................................... 19203163
May 5, 2020 (EP) ...................................... 20172936

(51) Int. Cl.
*B29C 45/16* (2006.01)
*B29C 33/38* (2006.01)
(Continued)

(52) U.S. Cl.
CPC ...... *B29C 45/1634* (2013.01); *B29C 45/0046* (2013.01); *B29C 45/16* (2013.01);
(Continued)

(58) Field of Classification Search
CPC . B29C 45/16; B29C 45/1634; B29C 45/1816; B29C 45/50; B29C 45/581
See application file for complete search history.

(56) References Cited

U.S. PATENT DOCUMENTS

| 4,176,152 A | 11/1979 | Sokolow |
| 2005/0100629 A1 | 5/2005 | Takai et al. |

(Continued)

FOREIGN PATENT DOCUMENTS

| AT | 406753 B | 8/2000 |
| CN | 1962233 A | 5/2007 |

(Continued)

OTHER PUBLICATIONS

KR20160086700A—Machine Translation (Year: 2016).*

(Continued)

*Primary Examiner* — Yunju Kim
(74) *Attorney, Agent, or Firm* — Armstrong Teasdale LLP

(57) ABSTRACT

Disclosed herein is a process for producing marbled moldings, where a first molding compound and at least one further molding compound are injected from an injection unit of a screw injection molding machine into an injection mold,
where the injection unit includes a barrel, a screw having a screw tip and a nozzle where the screw is rotatable and is disposed in the barrel so as to be movable (Continued)

between a forward position and a backward position, with a smaller distance between the screw tip and the nozzle in the forward position than in the backward position, and where the first molding compound includes a first polymer compound and a first colorant, and the at least one further molding compound includes a further polymer compound and optionally at least one further colorant.

Further disclosed herein is an apparatus for production of marbled moldings, and a process for producing the apparatus.

9 Claims, 11 Drawing Sheets

(51) Int. Cl.
  *B29C 45/00* (2006.01)
  *B29C 45/20* (2006.01)
  *B29C 45/30* (2006.01)
  *B29C 45/50* (2006.01)
  *B33Y 10/00* (2015.01)
  *B33Y 80/00* (2015.01)
  *B29K 67/00* (2006.01)
  *B29K 105/00* (2006.01)
  *B29L 31/00* (2006.01)

(52) U.S. Cl.
  CPC .............. *B29C 45/20* (2013.01); *B29C 45/30* (2013.01); *B29C 45/50* (2013.01); *B33Y 80/00* (2014.12); *B29C 33/3842* (2013.01); *B29C 2045/1698* (2013.01); *B29C 2045/308* (2013.01); *B29K 2067/006* (2013.01); *B29K 2105/0032* (2013.01); *B29K 2995/0021* (2013.01); *B29L 2031/7132* (2013.01); *B33Y 10/00* (2014.12)

(56) References Cited

U.S. PATENT DOCUMENTS

| | | | |
|---|---|---|---|
| 2015/0110918 A1 | | 4/2015 | Dezon-Gaillard et al. |
| 2017/0312954 A1* | | 11/2017 | Nobuta ............... B29C 45/0005 |

FOREIGN PATENT DOCUMENTS

| | | | | |
|---|---|---|---|---|
| DE | 1933570 A1 | | 1/1971 | |
| DE | 2714509 A1 | | 10/1978 | |
| DE | 4204015 A1 | | 8/1993 | |
| DE | 4332242 A1 | | 3/1995 | |
| DE | 10013617 A1 | | 9/2001 | |
| DE | 102004053575 A1 | | 6/2005 | |
| EP | 0581640 A1 | * | 2/1994 | ......... B29C 45/1634 |
| EP | 1556198 B1 | | 3/2010 | |
| GB | 2028218 A | | 3/1980 | |
| JP | 857203524 A | | 12/1982 | |
| JP | H10168253 A | | 6/1998 | |
| JP | H11138530 A | | 5/1999 | |
| JP | 2003200456 A | | 7/2003 | |
| JP | 2005262759 A | | 9/2005 | |
| KR | 20160086700 A | * | 7/2016 | ............ B29C 45/50 |
| TW | 411314 B | | 11/2000 | |
| WO | 9720674 A1 | | 6/1997 | |

OTHER PUBLICATIONS

EP0581640A1—Machine Translation (Year: 1994).*
Stück, D., Verweilzeit im Griff (Plastverarbeiter, Hüthig GmbH, Heidelberg, DE, Bd. 54, Nr. 4, Jan. 1, 2003, Seiten 56-57, XP009011004).
International Search Report for corresponding PCT/EP2020/078776 mailed Dec. 21, 2020; 4 pages.

* cited by examiner

METHOD AND DEVICE FOR PRODUCING MARBLED MOLDED PARTS AND METHOD FOR PRODUCING THE DEVICE

CROSS-REFERENCE TO RELATED APPLICATIONS

This application is a U.S. National Phase application of International Patent Application No. PCT/EP2020/078776, filed Oct. 13, 2020, which claims priority to European Patent Application No. 19203163.1, filed Oct. 15, 2019, and European Patent Application No. 20172936.5, filed May 5, 2020, each of which is hereby incorporated by reference herein.

The invention relates to a process for producing marbled moldings, wherein a first molding compound and at least one further molding compound are injected from an injection unit of a screw injection molding machine into an injection mold, wherein the injection unit comprises a barrel, a screw having a screw tip and a nozzle, and the screw is rotatable and is disposed in the barrel so as to be movable in the direction of a longitudinal axis of the barrel between a forward position and a backward position, with a smaller distance between the screw tip and the nozzle in the forward position than in the backward position, and wherein the first molding compound comprises a first polymer compound and a first colorant, and the at least one further molding compound comprises a further polymer compound and optionally at least one further colorant.

The invention further relates to an apparatus for production of marbled moldings, comprising an injection unit comprising a barrel having an interior, a screw and a nozzle with a nozzle head and a nozzle body, wherein the screw, which can also be referred to as conveying screw, is rotatable and is disposed in the barrel so as to be movable in the direction of a longitudinal axis of the barrel between a forward position and a backward position, and to a process for producing the apparatus.

A marbled molding typically has at least one marbled, i.e. patterned, visible face shows surface effects such as color shadowing, colored streaks, lines and structures. In marbled moldings, at least a portion of the colorants present is not distributed uniformly. The formation of the marbling effects is dependent on the proportions of different colors and the main color of the molding. Marbled moldings are frequently not entirely visually identical. If they show a repeating recognition pattern in the color structure, they can also be referred to as moldings with reproducible marbling. Particularly the main color, the shadowing and the main pattern exist in repeating form in reproducibly marbled moldings, although variations in the brightness of the coloring can occur.

Production of moldings, especially polymer moldings made from powders, pellets or molding compounds, which may each take the form of mixtures, is frequently accomplished using screw injection molding machines. For the production of colored polymer articles, colored polymer pellets are frequently used, or color-neutral pellets are mixed with colored polymer pellets having high pigment concentration before or during the liquefaction of the polymer in an extruder. Typically, mixing elements used in injection units ensure that the mixtures consisting of an uncolored base material and color pellets comprising a high concentration of colorants mix with maximum homogeneity, and components without streaks on the surface are produced.

Screw injection molding machines typically enable uniform plastification, in which the molding compound to be injected has a homogeneous temperature. In the production of marbled moldings, this homogenization is undesirable in that, although the temperature is uniform, the molding compound to be injected is not yet fully mixed, such that varying color components remain visible in the finished article.

Specifically for production of reproducible marbling patterns in which uniform repetition of the color progression and the color distribution is the aim, machines used are typically those in which at least two components that generate the marbling are supplied separately, for example in two separate injection units, to the injection mold.

Also known for production of marbled moldings are apparatuses, especially nozzles, which enable combination of molding compounds from two separate injection units in one injection mold.

The production of reproducibly marbled moldings in two-component injection molding machines is complex since two injection units are required and have to be operated, each of which has a screw, a barrel, feed devices and corresponding hydraulics for movement of the screw.

Furthermore, there are known inserts or barrels of injection molding machines, typically with a modified screw, which enable the production of marbled moldings in a one-component injection molding machine, but do not assure reproducibility of marbling patterns.

AT 406 753 B describes the use of displacement bodies upstream of a nozzle, which are known as torpedoes. The displacement bodies have a different surface configuration and are used for creation of marbling effects. The use of short screws with torpedoes produces inhomogeneous melts that result in the marbling effect.

DE 27 14 509 A1 has for its subject matter an apparatus for production of marbled moldings made from polymer material, wherein a one-zone short screw is used, followed by a displacement body in a heatable zone of a barrel.

U.S. Pat. No. 4,176,152 describes an injection molding machine having a barrel and a screw that rotates back and forth. A heat transfer and stratification body is disposed between the screw and an outlet from the barrel. The body especially has a fin structure on its outer circumference.

DE 42 04 015 A1 discloses an injection nozzle for a thermoplastic compound, consisting of a nozzle head and a base portion. The nozzle head is movable axially, such that a second hole or supply of a second thermoplastic molding compound that opens into an axial bore can be opened and closed.

DE 10 2004 053 575 A1 likewise relates to a nozzle for injection molding machines, wherein resins of two different compositions and different color are processed. A first passage in the nozzle communicates with a first injection unit, and a second passage in the nozzle communicates with a second injection unit.

JP 2003 200456 and JP 2005 262759 also describe nozzles for injection of two different resins that come from two separate plastifying units.

TW 411314 B has for its subject matter a process for producing polymer articles with a color progression, wherein a conical nozzle is used.

DE 43 32 242 A1 discloses a process and an apparatus for production of marbled polymer objects by means of an injection molding method, wherein color pigments are supplied at an introduction opening at the start of the screw flight.

DE 100 13 617 A1 is directed to a process for producing a polymer article having at least one marbled visible face. For this purpose, solid-state particles alignable by the action of a magnetic field are added to the compound of a thermoplastic polymer before or during liquefaction.

EP 1 556 198 B1 describes a mixing element that can replace a nonreturn valve at the screw tip of an injection molding machine.

It is an object of the present invention to provide a process for producing marbled moldings, wherein the marbling pattern generated is reproducible. Also proposed is an apparatus for production of marbled moldings, with which the configuration of the marbling pattern is variable in a controlled manner and, at the same time, high detail and reproducibility of the marbling pattern is achieved, and use of the same screw injection molding machines for different patterns with different modification complexity is possible.

The object is achieved by a process for producing marbled moldings, wherein a first molding compound and at least one further molding compound are injected from an injection unit of a screw injection molding machine into an injection mold, wherein the injection unit comprises a barrel, a screw having a screw tip and a nozzle, and the screw is rotatable and is disposed in the barrel so as to be movable in the direction of a longitudinal axis of the barrel between a forward position and a backward position, with a smaller distance between the screw tip and the nozzle in the forward position than in the backward position, and wherein the first molding compound comprises a first polymer compound and a first colorant, and the at least one further molding compound comprises a further polymer compound and optionally at least one further colorant, comprising the following steps:
  a) optionally feeding a first amount of the first molding compound onto the screw when the screw is in the backward position,
  b) optionally advancing the screw from the backward position into the forward position,
  c) feeding a second amount of the at least one further molding compound onto the screw,
  d) plastifying the first molding compound and the at least one further molding compound in the barrel, with rotation of the screw and conveying of at least a portion of the first molding compound and at least a portion of the at least one further molding compound into a clear space in the barrel between the nozzle and the screw tip, and with the screw moving from the forward position into the backward position,
  e) optionally feeding a new first amount of the first molding compound onto the screw when the screw is in the backward position,
  f) injecting the first molding compound and the at least one further molding compound from the clear space in the barrel into a cavity of the injection mold, with the screw advancing from the backward position into the forward position,
  g) cooling the first molding compound and the at least one further molding compound in the injection mold, so as to give a marbled molding, and
  h) removing the marbled molding from the injection mold,
wherein steps c) to h) are repeated, step e) is conducted before step f), and step a) is optionally conducted before step b), and wherein the feeding of the new first amount of the first molding compound in step e) and optionally the feeding of the first amount of the first molding compound in step a) is conducted separately in time or space from the feeding of the second amount of the at least one further molding compound in step c).

Additionally proposed is an apparatus for production of marbled moldings, comprising exactly one injection unit comprising a barrel having an interior, a screw and a nozzle, wherein the screw is rotatable and is disposed in the barrel so as to be movable in the direction of a longitudinal axis of the barrel between a forward position and a backward position, with a smaller distance between the screw tip and the nozzle in the forward position than in the backward position, and wherein the nozzle, comprising a nozzle head and a nozzle body, is releasably connected to the barrel and the nozzle head has at least two ducts connected at a first end of each duct to an exit opening of the nozzle, and at a second end of each duct to the interior of the barrel, wherein the at least two ducts run in a curved manner through the nozzle head. The nozzle head may also be referred to as nozzle cap. The exit opening is disposed on a side of the nozzle facing the injection mold. Through the exit opening, the first molding compound and the at least one further molding compound are injected into the injection mold.

Preference is given to using the apparatus for performance of the process of the invention for production of marbled moldings. The apparatus is an injection molding machine, namely a one-component injection molding machine.

The separation of the feeding of the first molding compound and of the at least one further molding compound in time or space limits the homogenization of the first molding compound and the at least one further molding compound during plastification, such that defined color boundaries and reproducible marbling patterns are visible in the molding produced. The addition of the first molding compound and of the at least one further molding compound can also be referred to as sequential or discrete. Accordingly, the first molding compound is distributed inhomogeneously in the at least one further molding compound prior to injection into the clear space between the nozzle and the screw tip.

Depending on the geometry of the nozzle, a defined, reproducible, i.e. repeatedly producible, pattern is established on at least one visible face of the marbled molding produced.

Reproducible marbling patterns are understood to mean patterns wherein the variances, if different moldings are compared with one another, are not perceived as being distinctly different by the human eye when they have been produced by the same process and the same apparatus. The moldings produced in accordance with the invention have patterns that reliably recur and are apparent. This is achieved especially via the defined feeding of the molding compounds.

The marbled moldings produced in accordance with the invention are especially usable for decorative purposes in the consumer goods sector. The marbled moldings may be completely marbled or comprise at least one marbled visible face. The marbled moldings may be three-dimensional or flat. The marbled moldings are preferably household articles such as bowls, plates, cups, handles or toilet seats, consumer goods such as laptop covers or protective cases for telephones or smartphones, toys such as spinning disks or spinning tops, accessories in the fashion industry such as buttons, or decorative elements in vehicle interiors, such as visors or covers.

The first molding compound and the at least one further molding compound are fed to the barrel of the injection unit and conveyed forward toward the nozzle in conveying direction by rotation of the screw. This at least partly, preferably completely, plastifies the first molding compound and the at least one further molding compound. The at least one further molding compound and optionally the first molding compound accumulate in the clear space between the nozzle and the screw tip, and move the screw axially backward into the rear position in the barrel. Preferably, the screw injection molding machine used in the process of the invention comprises exactly one injection unit and more preferably exactly one barrel and further preferably exactly one screw. The apparatus of the invention preferably comprises exactly one barrel and further preferably exactly one screw.

The feeding can also be referred to as metering, with arrival of the first molding compound or the at least one further molding compound, for example, via a funnel into a barrel and especially to the screw. The first molding compound and the at least one further molding compound are supplied in portions, separately from one another in time or space. What is meant by "in portions" is that the first molding compound and preferably also the at least one further molding compound are fed to the barrel discontinuously in the form of discrete portions, i.e. in the form of the first amount or of the second amount.

The plastifying is also referred to as dispensing, with conveying of the first molding compound and the at least one further molding compound by the screw in the direction of the nozzle and at least partial melting thereof. Preferably, at least a portion of the first molding compound and at least a portion of the at least one further molding compound are melted completely during the plastifying in step d).

The feeding of the second amount of the at least one further molding compound in step c) is preferably conducted after the advancing of the screw in step b).

Further preferably, the feeding of the new first amount of the first molding compound in step c) and optionally the feeding of the first amount of the first molding compound in step a) is complete before the advancing in step b) commences. In addition, the advancing in step b) is preferably complete before the feeding of the second amount of the at least one further molding compound in step c) commences.

The first molding compound preferably first comes into contact with the screw and then with the at least one further molding compound.

The first molding compound and/or the at least one further molding compound may be fed separately and directly into the barrel and especially directly onto the screw with a metering system.

Further preferably, the feeding of the second amount of the at least one further molding compound commences when the screw is in the forward position. The screw is preferably in the forward position when it has been moved to the maximum extent in the direction of the nozzle.

The at least one further molding compound, especially the second amount of the at least one further molding compound, can be fed in continuously. Preferably, the second amount of the at least one further molding compound is fed in continuously at least during the plastifying in step d).

Especially when the new first amount of the first molding compound in step e) and optionally the first amount of the first molding compound in step a) are fed in spatially separately from the feeding of the second amount of the at least one further molding compound in step c), the second amount of the at least one further molding compound can be fed in continuously during the feeding of the new first amount of the first molding compound in step e) and optionally during the feeding of the first amount of the first molding compound in step a).

When the new first amount of the first molding compound in step e) and optionally the first amount of the first molding compound in step a) are conducted spatially separately from the feeding of the second amount of the at least one further molding compound in step c), the new first amount or the first amount of the first molding compound is preferably fed in at a greater distance from the nozzle than the second amount of the at least one further molding compound.

After the plastifying, the rotation of the screw is preferably stopped, and the screw is moved forward into the forward position in conveying direction, such that the plastified first molding compound and the plastified at least one further molding compound are pushed through the nozzle into the cavity, which can also be referred to as the interior, of the injection mold.

The feeding of the new first amount of the first molding compound to the screw at the moment when the screw is in the backward position achieves synchronization of the pattern formation with the rhythm or timing of the injection operation, and hence ensures the reproducibility of the pattern in successively produced marble moldings. More preferably, the screw is at rest in the backward position while the first amount of the first molding compound is fed in.

The volume of the plastified molding compound comprising the at least one further molding compound and optionally the first molding compound which is present between the nozzle and the screw tip prior to injection into the clear space is also referred to as shot volume.

After the injecting in step f), the barrel is filled again. The second amount of the at least one further molding compound is fed in, plastification is effected again, and the screw moves back into the backward position. Thereafter, the first amount of the first molding compound is fed in, and injection is effected again.

The plastifying is preferably concluded at least once, more preferably at least twice, especially at least four times, with the at least one further molding compound and optionally with the first molding compound when the first amount of the first molding compound is fed in in step a). Preferably, the at least one further molding compound and optionally the first molding compounds are present in the barrel when the first amount of the first molding compound is fed in in step a).

Preferably, the first molding compound and/or the at least one further molding compound is/are fed to a backward portion of the barrel. The backward portion is understood to mean, at an end of the barrel remote from the nozzle, preferably not more than 50% of a total length of the barrel, more preferably not more than 20% of a total length of the barrel. The first molding compound and the at least one further molding compound can be supplied to the barrel at the same position or at different positions or feed openings. More particularly, the first molding compound and the at least one further molding compound are fed to the barrel at various positions in the same feed opening.

The first molding compound and the at least one further molding compound may be fed in in the form of powders, pellets or plastic compounds. The first molding compound and/or the at least one further molding compound may each take the form of a homogeneous and/or heterogeneous mixture.

Preferably, the first molding compound and/or the at least one further molding compound is/are fed in as pellets. Pellets refer generally to a free-flowing solid-state material which is, for example, cylindrical or lenticular and preferably has a maximum length of 1 mm to 10 mm, more preferably of 3 mm to 6 mm.

The first molding compound preferably comprises a first pellet material comprising the first polymer compound and the first colorant. The first pellet material may also be referred to as colored pellet material, which is preferably produced in an upstream step. The first molding compound may also be referred to as marbling batch or concentrate.

In particular, the at least one further molding compound, before being fed in, may comprise a mixture including at least two further pellet materials, especially a second pellet material and a third pellet material. The at least one further polymer compound may be present in the second pellet material, and the at least one further colorant may be present in the third pellet material.

Preferably, the marbled molding consists of the first molding compound and the at least one further molding compound.

The screw preferably has an intake zone, a compression zone and a metering zone, which can also be referred to as an ejection zone or homogenization zone.

The screw is preferably a single-flight screw. The screw especially has exactly one flight in which the first molding compound and the at least one further molding compound are conveyed. Further preferably, the screw has a flat screw flight.

The flight depth in the intake zone is preferably 0.05 to 0.15 times the outer screw diameter, and the flight depth in the metering zone 0.025 to 0.075 times the outer screw diameter. A compression ratio, which refers to a ratio between a flight volume of the intake zone of the screw to a flight volume of the metering zone of the screw, is preferably at least 2, more preferably more than 2. The screw preferably has a length within a range from 20 times to 23 times the outer screw diameter. A low screw flight has the advantage that less material is accommodated for the same diameter.

The screw of the apparatus of the invention may comprise a nonreturn valve, preferably disposed between the nozzle and the screw flight. The screw tip may have vanes, especially 3 to 4 vanes.

The injection unit preferably comprises a heating apparatus. The heating apparatus may surround the barrel completely, preferably partially. The nozzle may also include a heating apparatus. The heating apparatus assists the melting of the first molding compound and the at least one further molding compound.

Preferably, the cooling of the first molding compound and of the at least one further molding compound in the injection molding step g) is conducted simultaneously with the plastifying of the first molding compound and of the at least one further molding compound in the barrel in step d), and optionally at least partly simultaneously with the feeding of the second amount of the at least one further molding compound in step c).

Preferably, steps c) to h) are repeated more than once, more preferably more than three times, further preferably more than four times and especially preferably more than five times, in order to produce multiple marbled moldings successively. Preferably, steps a) to f) are conducted in the sequence specified.

Furthermore, the injecting in step f) is preferably repeated with an injection frequency, and each injection or advancing may be referred to as one shot. In addition, the feeding of the new first amount of the first molding compound in step e) is preferably repeated with a feed frequency. The feed frequency is preferably chosen such that it varies from the injection frequency by not more than 10%, further preferably by not more than 5% and especially preferably by not more than 1%. Correspondingly, the feeding of the new first amount of the first molding compound in step e) is especially preferably conducted with the cycle of injection in step f). In this case, the feeding of the new first amount of the first molding compound in step e) is preferably executed with a time delay from the injection in step f). More preferably, the feeding frequency is equal to the injection frequency. In this case, the first amount of the first molding compound is always executed with the same time delay from the injection or advance.

For a marbled molding, the feeding of the new first amount of the first molding compound in step e) and/or the feeding of the first amount of the first molding compound in step a) can be conducted before or after the feeding of the second amount of the at least one further molding compound in step c).

As well as the first molding compound, the barrel may also be supplied with at least two further molding compounds, by means of which it is possible to produce multi-color moldings additionally having a marbling pattern. The at least one further molding compound may be divided into multiple portions, in which case the multiple portions are preferably each fed in successively or stepwise.

The injection mold may comprise a gate of various types. Preferably, the injection mold comprises a gate selected from the group consisting of a hot runner, a sprue gate, a film gate, a distributor and a tunnel gate. The injection mold preferably has a sprue gate.

After the injection in step f), a hold pressure may be exerted by the screw on the molding in the injection mold. The hold pressure is preferably exerted before the plastifying in step d). While a hold pressure is being exerted by the screw on the molding in the injection mold, the screw is preferably in the forward position in the barrel or still in motion in conveying direction, in order to push more plastified molding compound into the injection mold, so as to compensate for material shrinkage in the course of cooling of the molding.

The second amount of the at least one further molding compound is preferably fed in in step c) while the hold pressure is being exerted on the injection mold. More preferably, the second amount of the at least one further molding compound is fed in in step c) when the exertion of the hold pressure is commenced.

Preferably, a ratio of a maximum internal free volume of the barrel that can be occupied by the first molding compound and the at least one further molding compound to an internal volume of the cavity is not more than 15, more preferably not more than 10, further preferably not more than 5 and especially from 2 to 5. The maximum internal free volume of the barrel may also be referred to as the melt duct. The maximum internal free volume of the barrel preferably describes the cylindrical internal volume of the barrel minus the volume occupied by the screw present in the barrel.

Preferably, the internal free volume beneath the feed opening and especially on the screw is filled only to an extent of 0% by volume to 80% by volume, more preferably of 10% by volume to 50% by volume, with the first molding compound and/or the at least one further molding compound or with the pellets of the first molding compound and/or the pellets of the at least one further molding compound. This can also be referred to as underfeeding, where the first molding compound and the at least one further molding compound are fed in at a reduced mass flow rate compared to a maximum mass flow rate conveyable by the screw.

Correspondingly, the barrel and the screw are designed such that there are preferably not more than 15, more preferably not more than 10, further preferably not more than 5 and especially from 2 to 5 shots in the injection unit, especially prior to injection.

The low internal free volume of the barrel results in a short dwell time for the first molding compound and the at least one further molding compound in the injection unit, which counteracts homogeneous mixing of the first molding compound and the at least one further molding compound and hence promotes the creation of a marbling pattern. The dwell time of the first molding compound and/or the at least one further molding compound in the barrel is preferably within a range from 1 second to 15 minutes, more preferably from 0.1 minute to 4 minutes, especially preferably from 0.5 minute to 2 minutes.

By virtue of the process of the invention, the first molding compound is contacted as late as possible with the at least one further molding compound in the barrel in order to limit the extent of mixing as far as possible. The reduction in the dwell time by virtue of a correspondingly small internal free volume of the barrel also minimizes the mixing of the first molding compound with the at least one further molding compound.

Preferably, a ratio of the sum total of the mass of the first amount of the first molding compound and the mass of the second amount of the at least one further molding compound to the mass of the marbled molding is 0.5 to 1.5, more preferably 0.8 to 1.2, further preferably 0.9 to 1, especially 1. This ratio is, for example, greater than 1 when, in the production of the marbled molding, at least one sprue is present, which also comprises the first molding compound and the further molding compound, but is removed from the marbled molding after production and is not part of the marbled molding. A ratio of less than 1 may exist, for example, when inserts, especially metal inserts, are integrated into the molding or two-component moldings that may have different hardnesses are produced, in which first a first component and then a second component are injected into the cavity, with the first component and/or the second component having marbling. By virtue of a ratio close to 1, the marbling, especially individual elements of the marbling pattern, such as rings or apexes, are positioned at a comparable location in successively produced marbled moldings, meaning that the reproducibility of the marbling over different marbled moldings is optimized, especially since the specific mass ratios are matched to the size of the molding and the rhythm of the injection. Concealment of different patterns from different injection operations is avoided.

Correspondingly, it is preferable that each shot is added individually, with the first molding compound for one shot and the at least one further molding compound for the same shot being supplied in the spatially or locally separated steps e) and optionally a) or c). The addition of the first molding compound and the at least one further molding compound is preferably effected in specific amounts, with the first amount and the second amount being sufficient for exactly one shot.

Preferably, a mass ratio of the first amount to the second amount is less than 0.1, more preferably less than 0.01 and especially less than 0.001. The first molding compound serves to form the marbling pattern in the at least one further molding compound that constitutes the base compound.

Preferably, a ratio of a first concentration of the first colorant in the first molding compound to a further concentration of the at least one further colorant in the at least one further molding compound is more than 20, more preferably more than 50 and especially more than 100. Correspondingly, it is preferable when the first colorant is at a higher concentration in the first molding compound than the at least one further colorant which is optionally present in the at least one further molding compound. The at least one further molding compound may already have been colored with the at least one further colorant before the at least one further molding compound comes into contact with the first molding compound.

Preferably, the first molding compound comprises 10% by weight to 60% by weight, more preferably 20% by weight to 40% by weight, based on the first molding compound, of the first colorant. The at least one further molding compound comprises preferably 0.1% by weight to 6% by weight, more preferably 0.2% by weight to 4% by weight, based on the at least one further molding compound, of the at least one further colorant.

By virtue of the concentration ratios stated, good recognizability and sharpness of the marbling pattern is assured, which assists the reproducibility of the pattern.

The second amount may comprise one or more further molding compounds. The first polymer compound and/or the at least one further polymer compound are preferably thermoplastic molding compounds. More preferably, the first polymer compound and/or the at least one further polymer compound comprise a polymer selected from the group consisting of polypropylene (PP), polyethylene (PE), polyoxymethylene (POM), polyethylene terephthalate (PET), polybutylene terephthalate (PBT), polyamide (PA), polycarbonate (PC), polyarylethersulfones (PSU, PESU, PPSU), thermoplastic polyurethanes (TPU), polybutylene adipate terephthalate (PBAT), polybutylene succinate (PBS), polylactide (PLA), polybutylene sebacate terephthalate (PBSeT), polylactic acid (PLA), polyethylene naphthalate (PEN), polyacrylmethacrylate (PMMA), polystyrene (PS), styrene-containing polymers such as acrylonitrile-butadiene-styrene copolymer (ABS) or mixtures thereof. The at least one further molding compound and optionally the first molding compound may be filled or reinforced molding compounds. More particularly, the at least one further molding compound and optionally the first molding compound may comprise at least one filler such as talc, glass beads or fibers, such as glass fibers or carbon fibers.

More preferably, a polymer present in the first polymer compound is also present in the at least one further polymer compound. Further preferably, the first polymer compound and/or the at least one further polymer compound comprise PBT; more preferably, the first polymer compound and the at least one further polymer compound comprise PBT.

The first colorant and/or the at least one further colorant may be soluble or insoluble in the first molding compound and/or in the at least one further molding compound during the process. The first colorant and/or the at least one further colorant are preferably color pigments. The first colorant is preferably a black colorant. The first colorant preferably comprises carbon black or a diaminophenazine compound such as nigrosin. More preferably, the first colorant consists of carbon black or at least one diaminophenazine compound such as nigrosin. The at least one further colorant is preferably a blue colorant, green colorant, yellow colorant, red colorant, based colorant, orange colorant, white colorant, gray colorant, brown colorant or gold colorant.

The viscosity of the first molding compound and/or of the at least one further molding compound, each in plastified form, is preferably within a range from 50 Pa·s to 1000 Pa·s. The injection rate of the plastified molding compounds upstream of the nozzle into the injection mold is preferably more than 25 $cm^3/s$, more preferably from 50 $cm^3/s$ to 100 $cm^3/s$, especially from 60 $cm^3/s$ to 80 $cm^3/s$, for example 70 $cm^3/s$. The backpressure, which typically refers to the pressure in the clear space in the barrel, is preferably 1 bar to 100 bar, more preferably 10 bar to 70 bar and further preferably 20 bar to 50 bar.

A nozzle temperature is preferably from 150° C. to 450° C., more preferably from 180° C. to 400° C. The first molding compound and the at least one further molding compound at the screw tip preferably have a temperature in the range from 150° C. to 450° C., more preferably from 180° C. to 400° C. The injection pressure is preferably 400 bar to 1000 bar.

The nozzle head preferably has 2 to 8, further preferably 3 to 8, more preferably 3 to 6, for example 3, 4 or 6, ducts that can also be referred to as holes, passages or bores. Preferably, centers of the radial cross-sectional areas of the ducts are at equal distances from one another. The shape, number and arrangement of the ducts influence the geometry of the marbling pattern created. Preferably, the at least two ducts are connected to the first end of each duct by a passage bore in the nozzle body, and the passage bore in the nozzle body is connected to the interior of the barrel. In this connection, "connected" is understood to mean fluidically connected, which can also be referred to as communicating.

Preferably, the ducts are separated from one another between their first end and their second end. More particularly, the at least two ducts each open separately by their first end into a front end face of the nozzle head, and by their second end into a rear end face of the nozzle head. More particularly, the at least two ducts do not have any passages and/or apertures to one another between their first end and their second end. Correspondingly, preferably no exchange of plastified molding compound between the ducts takes place in the nozzle head; instead, the plastified molding compound comprising the first molding compound and the at least one further molding compound are pushed separately through the individual ducts. Correspondingly, preferably no additional mixing takes place through the ducts. The two separate ducts thus counteract homogeneous mixing of the first molding compound with the further molding compound, such that reproducibility is assisted.

The at least two ducts may run straight, at least in the process of the invention, and/or on a curved track through the nozzle head, or may each form a spiral, especially at least in part. In the apparatus of the invention for production of marbled moldings, the at least two ducts run in a curved manner through the nozzle head. Preferably, the at least two ducts in the process of the invention run in a curved manner through the nozzle head. Further preferably, the at least two ducts run at least partly in a curved manner, i.e. merely partly or completely in a curved manner, through the nozzle head.

When the at least two ducts run straight through the nozzle head, the ducts can also be referred to as straight bores. The ducts here preferably run parallel to a longitudinal axis of the nozzle head and preferably parallel to a longitudinal axis of the barrel. A progression of the at least two straight ducts where these run in an inclined manner in relation to the longitudinal axis of the head is also possible. The inclination imposes a slight twist on the plastified molding compounds.

The ducts may also have different cross-sectional geometries and/or different cross-sectional sizes.

In a preferred embodiment, the at least two ducts each at least partly form a spiral. A spiral in the context of the invention is understood to mean a three-dimensional spiral that can also be referred to as a helical line. By virtue of the spirals respectively formed by means of the at least two ducts, a twist is imposed on the plastified molding compound, which is reflected in the marbling pattern of the molding produced. More particularly, the at least two ducts each have a center axis, with the center axis of the respective duct in the form of the spiral arranged around the longitudinal axis of the nozzle head. Further preferably, the center axes of the at least two ducts at each position are disposed with the same distance from one another, and further preferably also with the same distance from the longitudinal axis of the nozzle head. Alternatively, the distance between the center axes of the at least two ducts may also vary, and may increase or decrease in conveying direction. The center axis in each case runs through the centers of the cross-sectional areas of the respective duct. The spirals may be right-handed or left-handed in conveying direction.

The spirals that are each formed by one of the at least two ducts preferably have the same geometry, such as slope and number of windings, and are offset from one another by a radial angle with regard to the longitudinal axis of the nozzle head. The slope reported is especially the slope angle which, for example with a constant slope and constant diameter, is defined as follows:

$$\alpha = \arctan\left(\frac{S}{\pi \cdot D}\right)$$

with α: slope angle, S: distance in longitudinal axis direction of the nozzle head which is covered in a complete winding and can also be referred to as pitch height, and D: diameter of the spiral.

The spiral preferably has a slope of less than 70° at at least one position.

The spiral which is formed by one of the at least two ducts in each case may have a constant slope. The constant slope is preferably within a range from 5° to less than 60°, further preferably from 10° to 40° and especially preferably from 15° to 30°. For example, the constant slope is 20°.

Preferably, the spiral has different slopes at each of at least two different positions. The at least two different positions on the spiral preferably have a different distance from the exit opening of the nozzle. Preferably, a first slope of the spiral at a first position differs from a second slope of the spiral at a second position by at least 20°; preferably, a difference, especially a maximum difference, of the first slope and the second slope is more than 30° and less than 90°, for example 60°.

Preferably, the slope of the spiral decreases in the direction of the exit opening of the nozzle. For instance, the slope of the spiral, for example in conveying direction of the plastified molding compound, may vary from a first position, for example at a second end face, relatively close to the barrel, of greater than 70° C. to a second position at a first end face, close to the exit opening of the nozzle, of less than 30°. The change, especially the continuous change, from a steep slope to a gentle slope in conveying direction of the plastified molding compound enables favorable entry in terms of flow and simultaneously the application of a significant twist at the exit from the at least two ducts.

Preferably, the spiral has a number of windings, which can also be referred to as rotations, and the number of windings is further preferably within a range from more than 0.25 to 5.

Correspondingly, the spiral preferably covers an angle of rotation of more than 90° to 1800°. Further preferably, the number of windings is within a range from more than 0.25 to 3, especially within a range from more than 0.50 to 3, for example within a range from 0.51 to 2.

When the at least two, preferably at least three, more preferably exactly three, ducts are in spiral form, the first end of each duct, in a further embodiment, is preferably offset radially by an angle of 45° to 180°, more preferably from 90° to 180° and especially preferably from 110° to 130°, for example 120°, with respect to the second end of the duct. The ducts in spiral form may also be referred to as wound bores.

When the at least two ducts each at least partly form a spiral, the at least two ducts may each be designed, for example, as a screw flight or wound bore, which may also be referred to as curved bore.

If the at least two ducts are designed as a screw flight, a portion of the nozzle head that separates the at least two ducts from one another may form multiple vanes. More particularly, the number of vanes is equal to the number of the at least two ducts, which, in this case, are separated from one another in cross section by a land.

The design of the at least two ducts, preferably at least three and more preferably exactly three ducts, as a screw flight in each case may also be described such that a multivane, preferably three-vane, land which is rotated in radial direction along a central longitudinal axis of the nozzle is disposed in a cylindrical bore, especially a cylindrical flow duct bore. Further preferably, the at least two ducts are bounded by two cylinders in a concentric arrangement, each of which are parts of the respective outer face. More particularly, the at least two ducts are bounded by the same two cylinders in a concentric arrangement.

The at least two ducts may have different cross-sectional geometries and/or different cross-sectional sizes. The at least two ducts preferably have the same cross-sectional geometry and the same cross-sectional size.

The ducts preferably each have, in a radial cross section of the nozzle head, a round, ellipsoidal, ring segment-shaped or polygonal, such as hexagonal or triangular, cross-sectional area, preferably a triangular cross-sectional area. The triangular cross-sectional area may have at least one curved side line. A triangular cross-sectional area having at least one curved side line, for example in the execution of the at least two ducts, preferably at least three and more preferably exactly three ducts, takes the form of one screw flight in each case. The ring segment preferably covers an angle within a range from 100° to 180°. Especially when the number of the at least two ducts is at least four, the angle of the ring segment may be less than 100°. If the ducts have a triangular cross section and intervening walls are formed between the at least two ducts as a screw flight, this may also be described in such a way that the hot runner has a cylindrical central melt duct bore in which there is disposed a spindle corresponding to the vanes that separates the at least two ducts from one another. If the at least two ducts are each designed as a wound bore, the at least two ducts preferably each have a round, ellipsoidal or polygonal, such as hexagonal, cross-sectional area.

The cross-sectional area of the section of the nozzle head in which the at least two ducts are disposed preferably has an opening ratio which is the ratio of the area available for flow to the total area and is 40% to 80%, further preferably 50% to 75%. The calculation of the opening ratio is preferably based on a cross-sectional area, especially a round cross-sectional area, the radius of which corresponds to the maximum distance of a wall of the at least two ducts from the longitudinal axis of the nozzle head. The opening ratio may, for example, be 68% in the case of two ducts, each of which forms a spiral in the form of a screw flight with variable slope of 90° to 30°, and 51% in the case of three ducts, each of which forms a spiral in the form of a screw flight with variable slope of 90° to 30°. Preferably, the areas available for flow in the first end face and in the second end face into the at least two ducts or out of the at least two ducts are essentially the same. Correspondingly, the entry areas and the exit areas of the at least two ducts preferably differ from one another by less than 30%, more preferably by less than 10% and especially preferably by less than 5%, based in each case on the entry area. This relates to the individual ducts of the at least two ducts and to the sum total of the entry areas and exit areas of the at least two ducts.

The nozzle head may be in one-piece or multipiece form. What is meant by "in one-piece form" is more particularly that a one-piece component is produced from a continuous material and especially does not have any bonds, for example weld seams and/or solder seams. For example, the walls of the at least two ducts, especially when they are in the form of vanes, may be molded onto a hollow cylindrical basic shape of the insert or onto a fully cylindrical portion of the insert in a central arrangement. A continuous material is understood to mean a material having a homogeneous composition over the entire one-piece component. The one-piece component is especially not composed of multiple layers or multiple components and/or does not have any coatings of a further material.

The nozzle head preferably comprises an insert which is preferably cylindrical, with the at least two ducts further preferably being disposed in the insert. Accordingly, it is possible to use a nozzle head with varying inserts that may have different duct progressions, which enables high flexibility in the configuration of the marbling patterns in a machine. The different inserts may be exchanged as required in the nozzle head. The insert is preferably designed for an accurate fit with a preferably central cylindrical bore in the nozzle head. Use of the insert allows creation of different marbling patterns in rapid sequence in the same screw injection molding machine.

The insert is further preferably in one-piece form. In particular, outer faces, preferably all outer faces, of the at least two ducts that are preferably fully closed are bounded by the one-piece insert. The first end face and the second end face, in the cross section of the at least two ducts, are free of material of the insert, such that the plastified molding compound can pass through the first end face and the second end face.

Additionally proposed is a process for producing the apparatus of the invention, wherein at least the nozzle head or at least the insert is produced by an additive method, especially by means of 3D printing. The production of the at least two ducts by an additive method enables production of ducts with more complex, especially curved spiral, progressions, for example as a screw flight. Moreover, this production, similarly to the case of cast components, leads to a surface roughness that has a positive effect on the marbling pattern. Preferably, the additive method produces layers having a layer height of in each case 0.08 mm to 0.2 mm, for example 0.1 mm.

Moreover, the production of the apparatus of the invention, or at least of the nozzle head or at least of the insert, by means of the additive method, enables creation of an undercut in order to achieve a greater area available for flow through the at least two ducts. What is meant by an undercut in the context of the invention is that a diameter of an insert melt duct increases in conveying direction. More particularly, an insert melt duct in a central arrangement which is disposed at a second end face may have a diameter that increases in conveying direction.

The additive method also enables production of ducts, where the at least two ducts have an undercut and each especially have more than 0.5 winding. An undercut with regard to the at least two ducts is especially understood to mean that the cross-sectional areas of a duct do not overlap at the first end face and at the second end face in axial projection.

Additive methods used may include laser welding methods or melt layering methods such as fused deposition modeling (FDM) or fused filament fabrication (FEE). For production of the nozzle or parts of the nozzle, especially at least the nozzle head or at least the insert, it is possible to use a metal injection molding feedstock (MIM feedstock), for example Catamold®, as material. MIM feedstock materials comprise various steel types, for example stainless steels or tool steels, such that the one-piece component produced, especially the insert, can be specifically matched to the end use.

Preferably, the nozzle, the nozzle head and/or at least the insert is produced from a metal-comprising powder. Further preferably, the nozzle, the nozzle head and/or at least the insert is produced from a composition comprising, based on the composition, 30% by volume to 70% by volume, more preferably 40% by volume to 60% by volume, of at least one inorganic powder and 30% to 70% by volume, more preferably 40% to 60% by volume, of at least one binder. The particle size of the at least one inorganic powder is preferably from 0.5 µm to 50 µm, more preferably from 0.1 µm to 30 µm. In addition, the at least one inorganic powder preferably comprises a metal, a metal alloy, a precursor compound of a ceramic material, or mixtures thereof. More preferably, the at least one inorganic powder consists of a metal, a metal alloy, a precursor compound of a ceramic material, or mixtures thereof. The at least one binder preferably comprises a polymer composition, especially POM. Further preferably, the at least one binder consists of POM. The composition may be used in pellet or filament form.

The nozzle may be designed as a needle valve nozzle or open nozzle. An open nozzle comprises the nozzle head and the nozzle body, which have a single straight central bore.

The nozzle body of a needle valve nozzle comprises a receiving device for a needle, which is preferably connected to the nozzle body via two lands.

As well as the insert, the nozzle head may have one, two or more disks that may serve for positioning and fixing of the insert in the nozzle head. More preferably, the insert is disposed between two disks. The disks preferably have a central bore.

For performance of the process of the invention for producing reproducibly marbled moldings, any kind of nozzle is usable. Depending on the configuration of the model, different modelling patterns are produced on the moldings.

For instance, even the use of a needle valve nozzle leads to a highly pronounced marbling pattern. The specific form of the marbling pattern is influenced by the geometry of the holder of the needle valve nozzle, and likewise by the configuration of the screw tip. By virtue of different geometric configuration of the internals of the screw injection molding machine, different weld lines are generated in the plastified molding compound, which crucially determine the marbling pattern.

The nozzle head having at least two ducts may be used in combination with an open nozzle. Nozzle heads having a central bore may be used in combination with a needle valve model.

More particularly, the nozzle has a smaller outer diameter than the barrel. The nozzle is especially releasably connected by means of a screw connection to the barrel. In addition, at least at one point, an internal free cross-sectional area of the nozzle is less than an internal free cross-sectional area of the barrel. The barrel has different internal diameters depending on the product to be produced. The internal diameter is, for example, within a range from 10 mm to 150 mm or from 25 mm to 50 mm, such as 25 mm or 30 mm. The exit opening has a passage, for example, with a diameter of 1.5 to 10 mm, or from 3 to 6 mm, such as 5 mm.

When an open nozzle without the at least two ducts is used, a circular uniform distribution of color is visible. The optical effect which is generated by the use exclusively of an open nozzle can be described as concentric circles. If at least two, such as 3, 4 or 6, ducts are used, the circular structure is interrupted, and slight vortexing of the first molding compound in the at least one further molding compound is visible. A number of strips corresponding to the number of ducts that generate weld lines is apparent.

By execution of the at least two ducts as spirals with a round or ellipsoidal radial cross-sectional area, vortexing of the first molding composition in the at least one further molding composition is enhanced. If the at least two ducts are each executed as a screw flight, waves in the form of strips are formed as a marbling pattern with very good reproducibility.

If the barrel is supplied not only with the first molding compound but with at least two further molding compounds, each further molding compound may comprise a further polymer compound and optionally at least one further colorant. The further molding compounds may be added to the barrel together with or before or after, optionally directly before or directly after, the at least one further molding compound. The at least two further molding compounds may also be fed in continuously.

BRIEF DESCRIPTION OF THE FIGURES

Working examples of the invention are shown in the figures and will be more particularly described in the description which follows. The invention is not limited to the working examples described here and the aspects emphasized therein. Instead, within the scope described by the claims, there is a multitude of possible modifications that are within the abilities of the person skilled in the art. The figures show:

FIG. 1 shows a schematic diagram of a screw injection molding machine 7 comprising an injection unit 5. The injection unit 5 comprises a barrel 11, a screw 13 with a screw tip 15, and a nozzle 17 having a nozzle head 37 and a nozzle body 39. The screw 13 is rotatable and mounted in the direction of a longitudinal axis 19 of the barrel 11. The screw 13 is in a backward position 23 in the barrel 11, with a distance 25 extending between the nozzle 17 and the screw tip 15, such that there is a clear space 27 between the nozzle and the screw tip 15 in the barrel 11.

Figure 1:
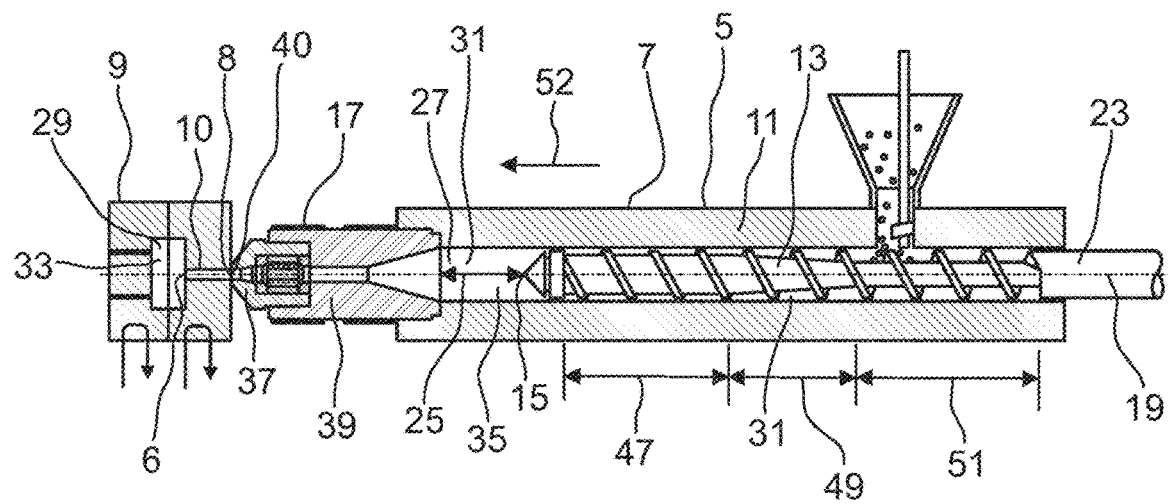
FIG. 1 a first schematic diagram of a screw injection molding machine.

The nozzle 17 that has the nozzle head 37, the nozzle body 39 and an exit opening 40 is adjoined by an injection mold 9 having a cavity 29 having an internal volume 33. In addition, the injection mold 9 has an entry opening 8 into the injection mold 9 and an inlet 6 into the cavity 29.

The screw 13 has a metering zone 47, a compression zone 49 and an intake zone 51. The barrel 11 has a longitudinal axis 19. The screw 13 can be used to convey molding compounds in a conveying direction 52 into the clear space 27. The clear space 27 is part of the interior 35 of the barrel 11, which is bounded by the barrel 11 and the screw 13.

Figure 2:
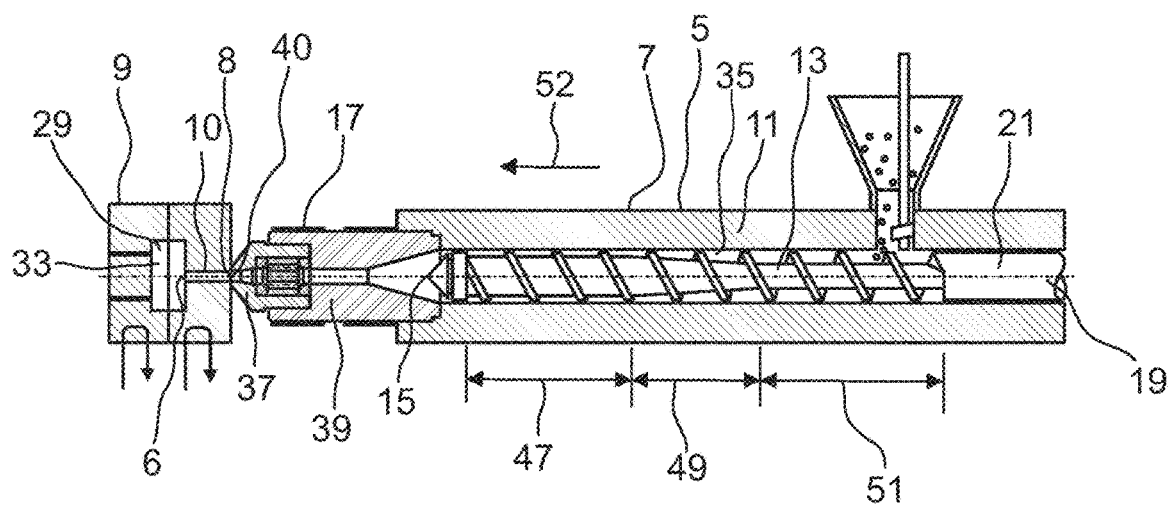
FIG. 2 a second schematic diagram of a screw injection molding machine.

FIG. 2 shows a second schematic diagram of a screw injection molding machine 7 having an injection mold 9 corresponding essentially to the diagram of FIG. 1. However, the screw 13 according to FIG. 2 is in a forward position 21 in the barrel 11. By comparison with FIG. 1, the distance 25 has been reduced by an advance of the screw 13.

Figure 3:
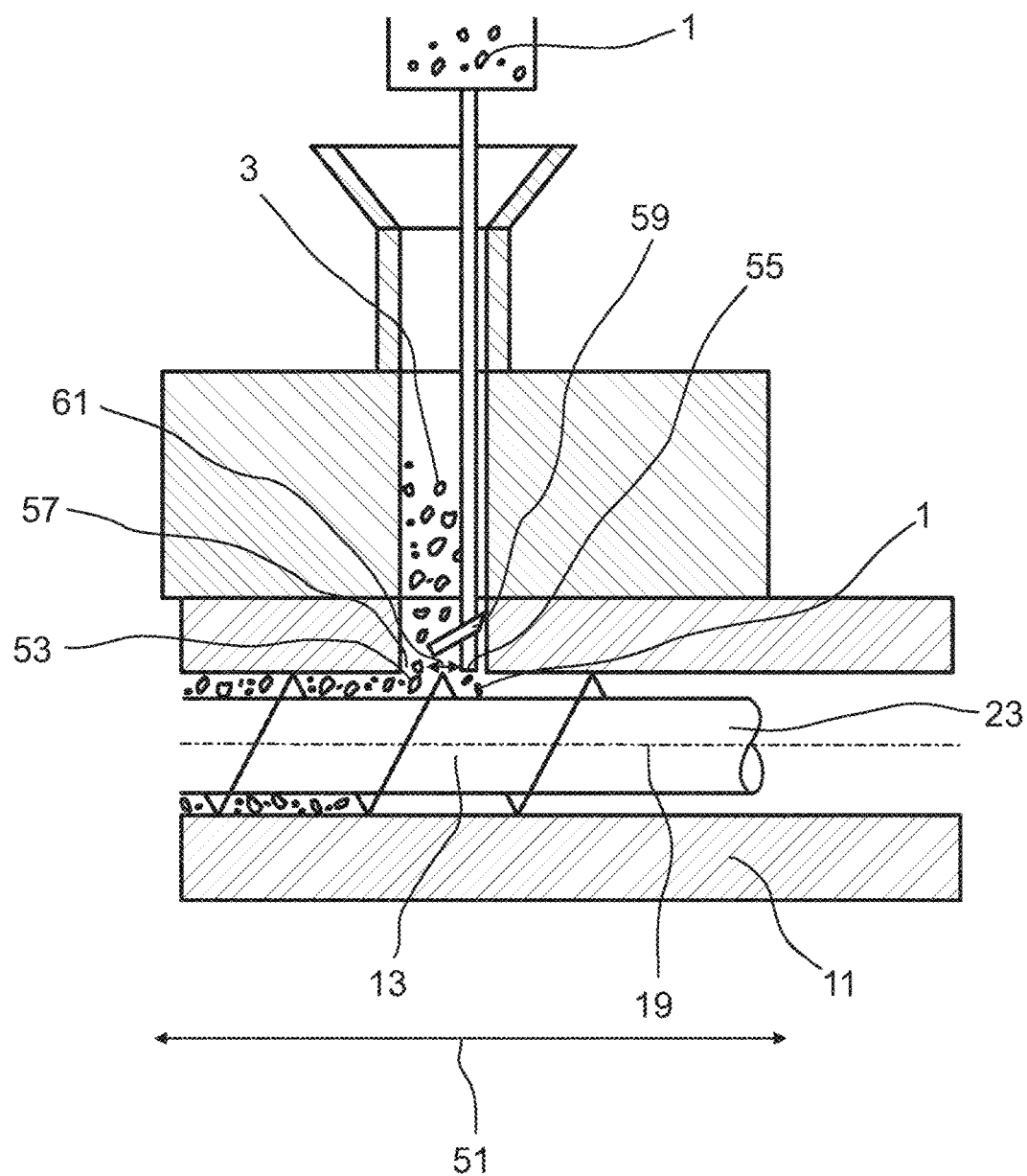
FIG. 3 a detail of a screw injection molding machine.

FIG. 3 shows a detail of an injection molding machine 7. A portion of an intake zone 51 of a screw 13 present in a barrel 11 is shown. The barrel 11 has a longitudinal axis 19, along which the screw 13 is movable. The screw 13 is in a backward position 23 in the diagram according to FIG. 3. Part of the screw 13 is beneath a feed opening 53. In the embodiment shown, a first molding compound 1 and a further molding compound 3 are fed to the screw 13 through the feed opening 53. The feed opening 53 has a first region for feeding in the first molding compound 1 and a second region 57 for feeding in the further molding compound 3. By virtue of a cover 59, there is a second distance 61 between the first region 55 and the second region 57, by means of which the first molding compound 1 is fed in spatially separately from the further molding compound 3.

Figure 4:
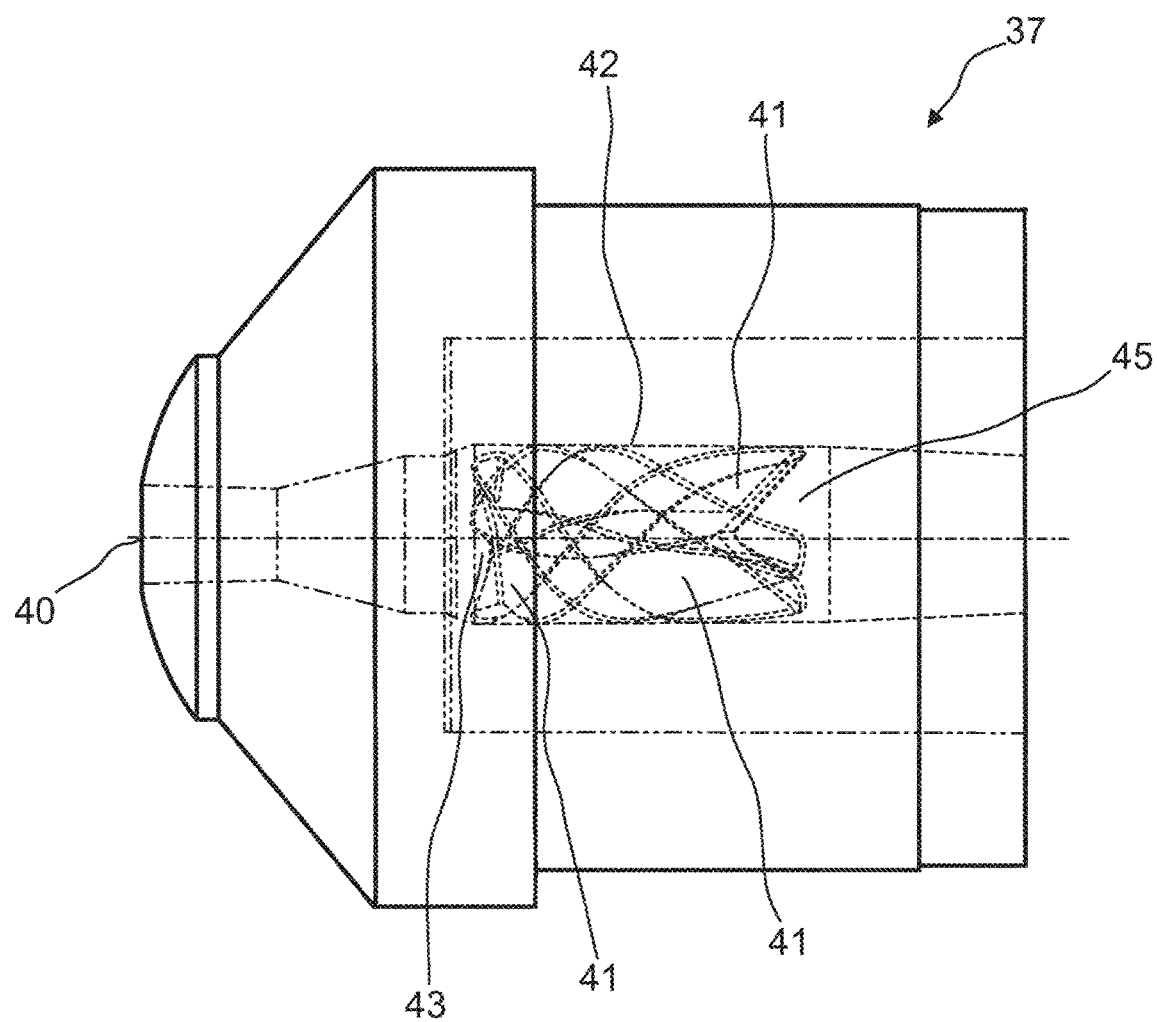
FIG. 4 a nozzle head.

FIG. 4 shows a nozzle head 37 of a nozzle 17 having an exit opening 40. An insert 42 having three ducts 41 is disposed in the nozzle head 37. The ducts 41 are each designed as a screw flight. Each duct 41 has a first end 43 and a second end 45. The first end 43 of each duct 41 communicates with the exit opening 40, and the second end 45 of each duct 41 communicates with an interior 35 of a barrel 11 which is releasably connected to the nozzle 17. The barrel 11 is not shown in FIG. 4; it adjoins the nozzle 17 on the side of the nozzle 17 remote from the exit opening 40.

Figure 5:
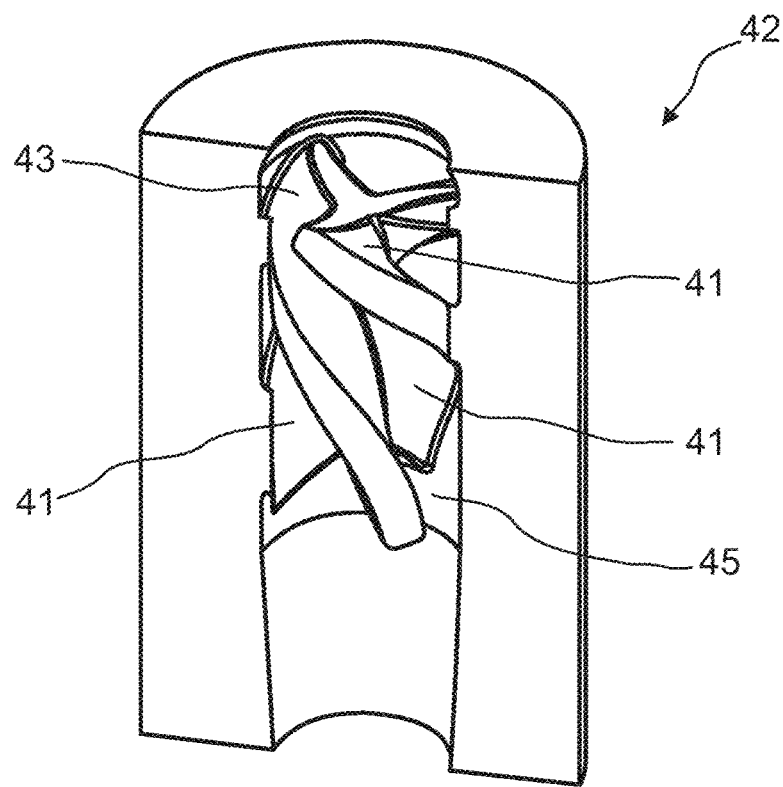
FIG. 5 a detail of a nozzle head.

FIG. 5 shows a half-section view of the insert 42 disposed in the nozzle head 37 according to FIG. 4.

Figure 6:
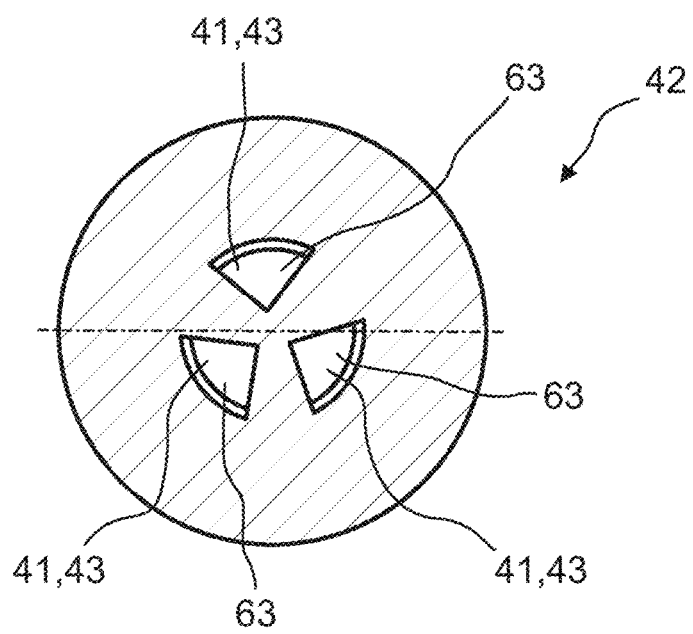
FIG. 6 a radial cross section of the detail of the nozzle head.

FIG. 6 shows a radial cross section of the detail of the nozzle head 37 according to FIGS. 4 and 5. The insert 42 has three ducts 41, the first end 43 of which is apparent, each with a triangular cross-sectional area 63.

Figure 7:
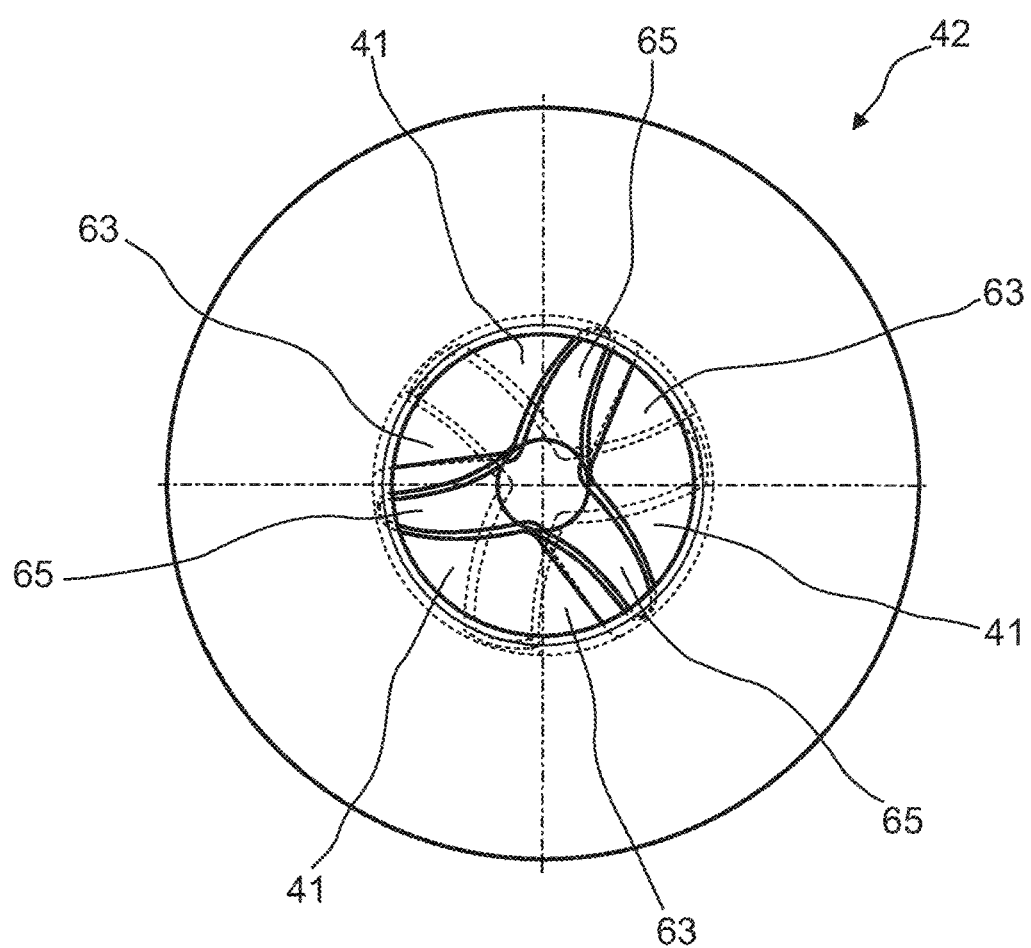
FIG. 7 a further radial section view of the detail of the nozzle head.

FIG. 7 shows a radial section view of the insert 42 according to FIG. 5. The triangular cross-sectional areas 63 of the ducts 41 are apparent in the form of solid lines in a first viewing plane. The ducts 41 with their triangular cross-sectional areas 63 are also shown in a further plane by dotted lines that are below the first viewing plane, such that the progression of the ducts 41 in the insert 42 is apparent. The lands 65 separate the ducts 41 from one another.

Figure 8:
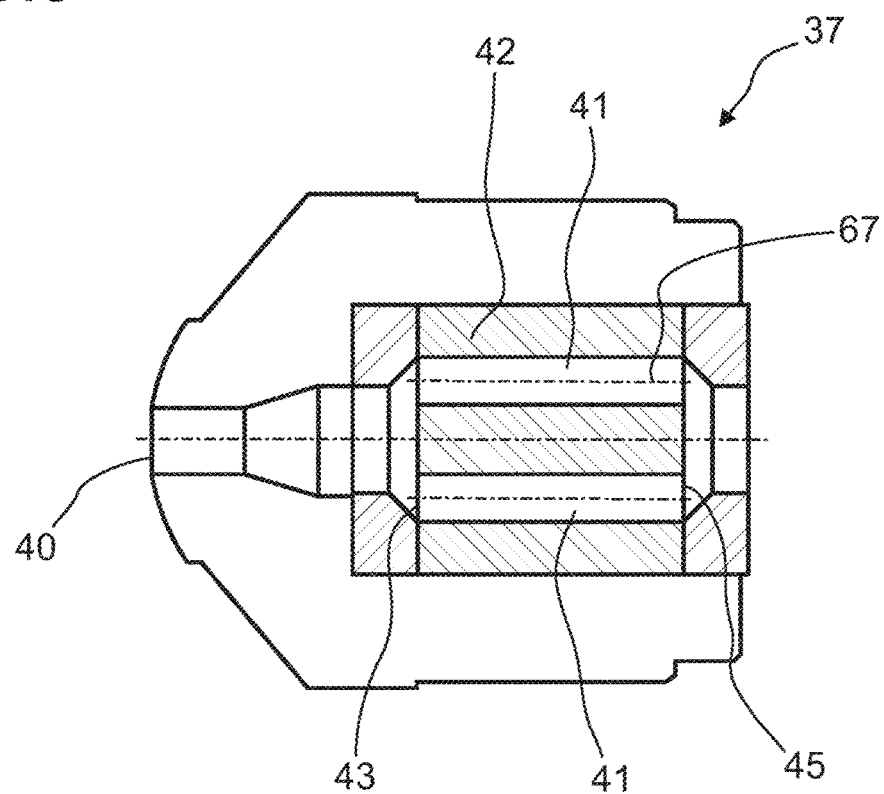
FIG. 8 a further embodiment of a nozzle head.

FIG. 8 shows a further embodiment of a nozzle head 37. An insert 42 having four straight bores as ducts 41 is disposed in the nozzle head 37.

Figure 9:
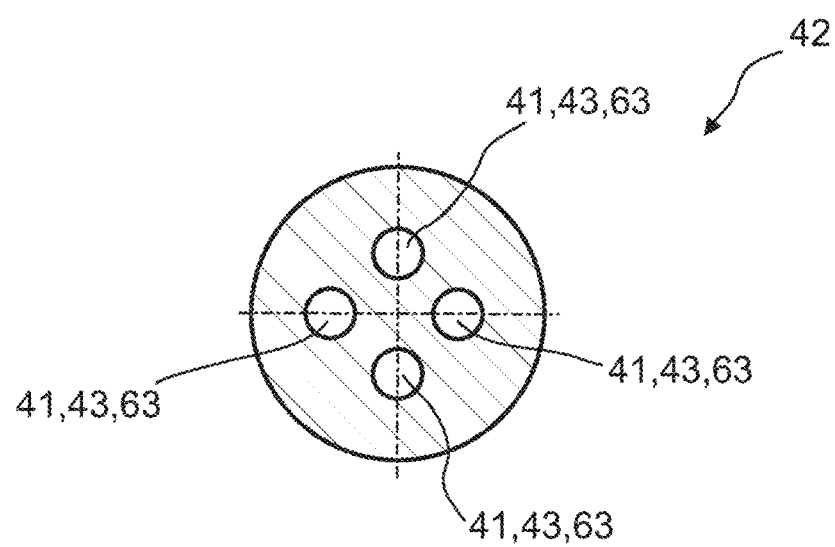
FIG. 9 a radial cross section of a detail of the further embodiment of the nozzle head, FIG. 10 a detail of a further embodiment of a nozzle head, FIG. 11 a radial cross section of the detail of the further embodiment of the nozzle head, FIGS. 12 to 21 each a top view or a perspective view of various embodiments of the at least two ducts, FIGS. 22 to 27 each a top view, a perspective view or a longitudinal section of two further embodiments of the at least two ducts, and FIG. 28 an insert with an undercut.

FIG. 9 shows a radial cross section of the insert 42 according to FIG. 8. The ducts 41 have round cross-sectional areas 63.

Figure 10:
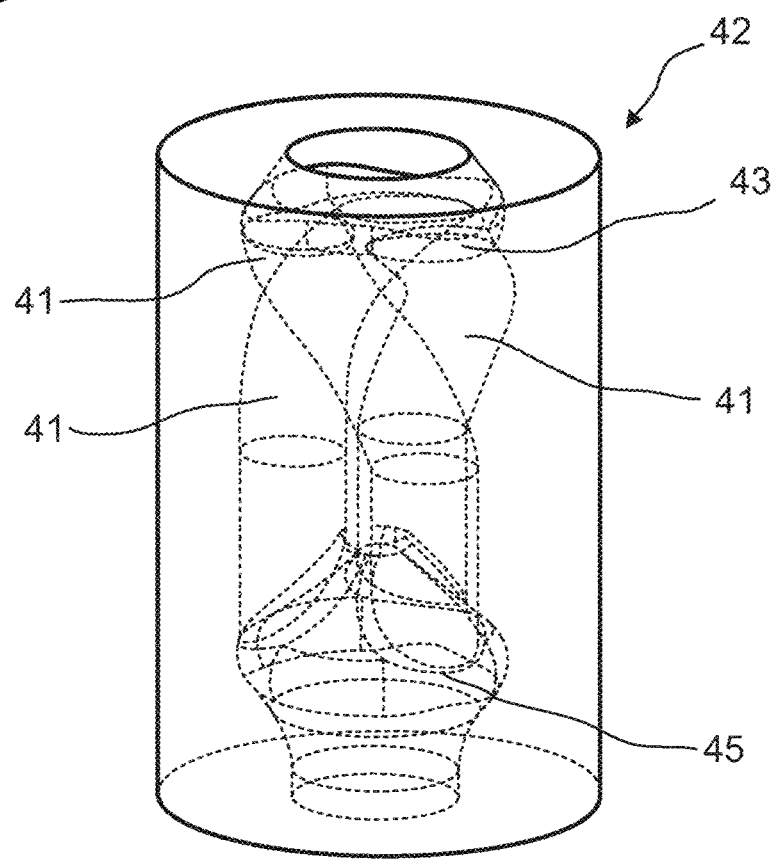

FIG. 10 shows yet a further embodiment of a nozzle head 37. The detail shows a further insert 42 that may be disposed in the nozzle head 37. The insert 42 has three ducts 41. The three ducts 41 have round cross-sectional areas 63 and each have spiral curvature. A first end 43 of each duct 41 is radially offset by 120° with respect to a second end 45 of the duct 41. The first end 43 of each duct 41 communicates with an exit opening 40 of a nozzle 17 in which the insert 42 is disposed, and the second end 45 of each duct 41 communicates with an interior 35 of a barrel 11 which is releasably connected to the nozzle 17 and is not shown in FIG. 10.

Figure 11:
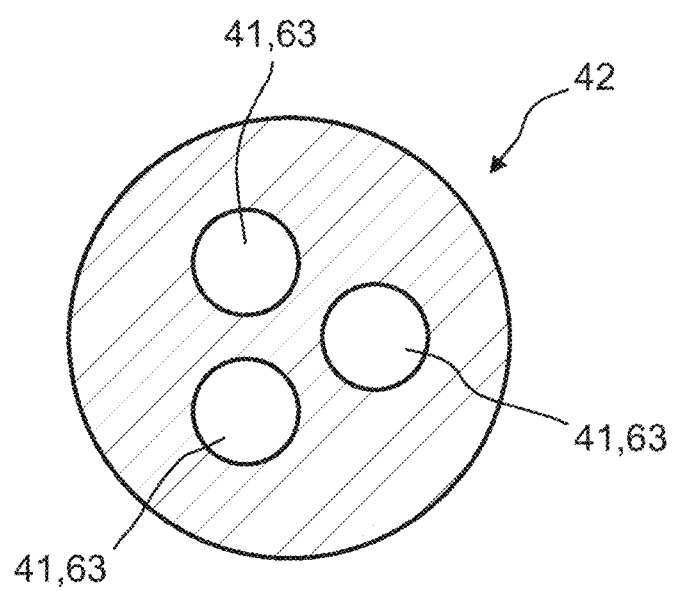

FIG. 11 shows a radial cross section of the insert 42 according to FIG. 10. The round cross-sectional areas 63 of the three ducts 41 are visible.

FIGS. 12 to 21 show five further embodiments of an insert 42, each of which is shown in a top view or perspective view. In FIGS. 12 to 21, ducts 41 in each case form a spiral 75, with the center axis 67 of each duct 41 disposed in the form of the spiral 75 in each case and having a particular number of windings 50.

Figure 12:
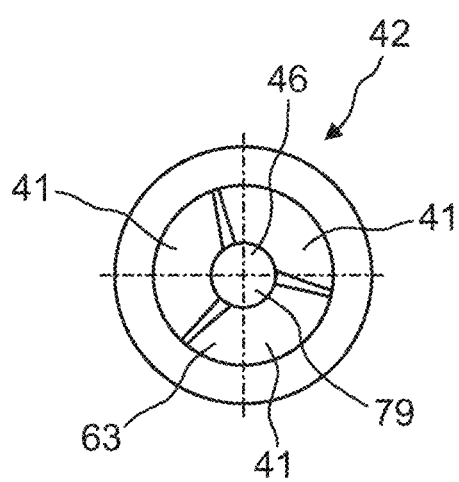
Figure 13:
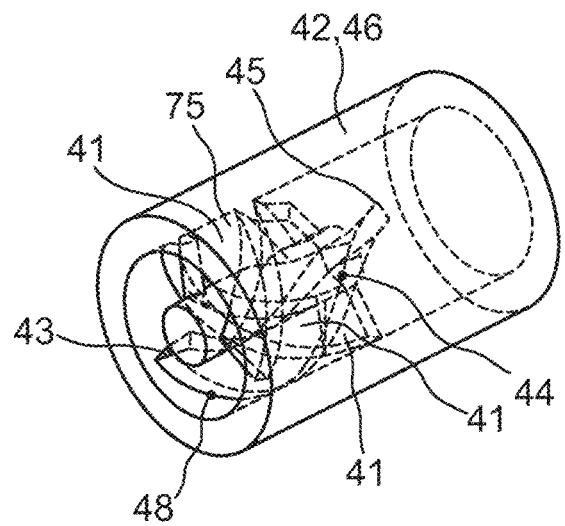

According to FIGS. 12 and 13, the insert 42 has three ducts 41 that are divided from one another by a solid cylinder 79. The slope of the spirals 75 decreases in conveying direction 52, i.e. from the second end 45 to the first end 43 of each duct 41. There is a greater slope in a first position 44 than in a second position 48. The slope changes from about 90° to a relatively gentle slope of about 30°. This results in favorable entry in terms of flow and a significant twist, which is imposed on the plastified molding compound at an outlet, i.e. at the first end 43 of every duct 41. There is a constant free cross-sectional area 63 and hence a constant opening ratio. The spirals 75 each have a half winding 50, such that a land 65 between two ducts 41 is rotated by 180° compared to the first end 43 and second end 45.

Figure 14:
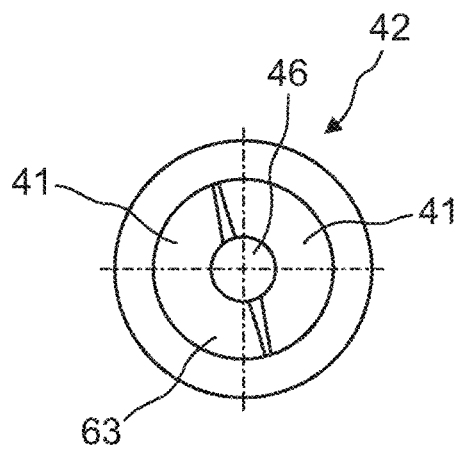
Figure 15:
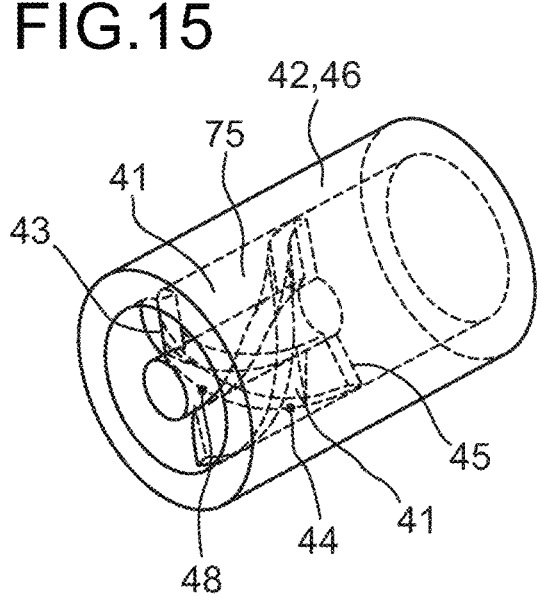

The insert 42 according to FIGS. 14 and 15 corresponds to the insert 42 according to FIGS. 12 and 13, except that only two ducts 41 are present.

Figure 16:
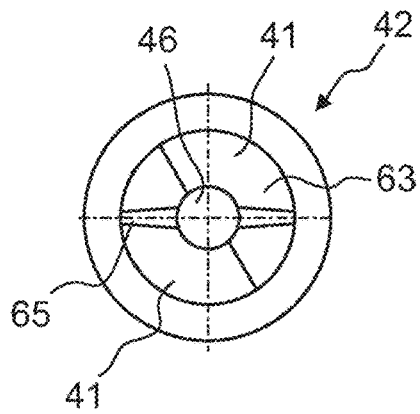
Figure 17:
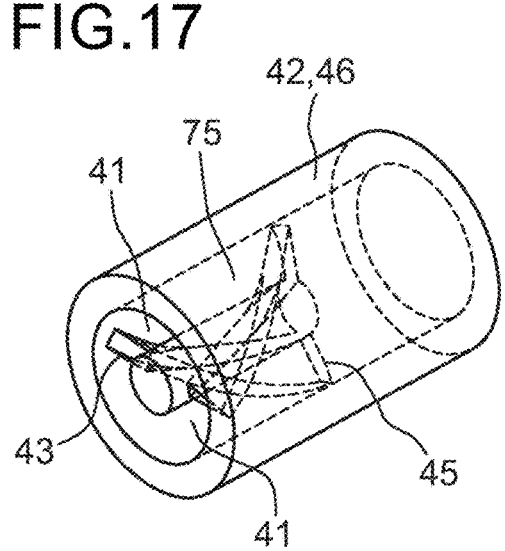

The insert 42 according to FIGS. 16 and 17 corresponds essentially to the insert 42 according to FIGS. 14 and 15, except that the spirals 75 have a constant slope and each have only about one third of a complete winding 50, such that the land 65 is rotated by about 120° compared to the first end 43 toward the second end 45. The slope is about 60°.

Figure 18:
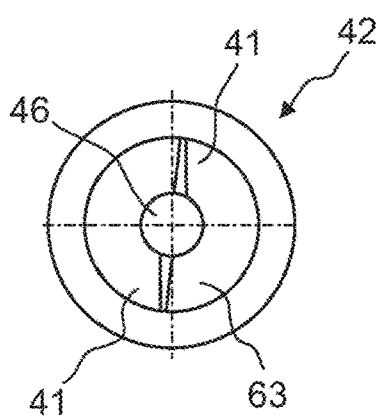
Figure 19:
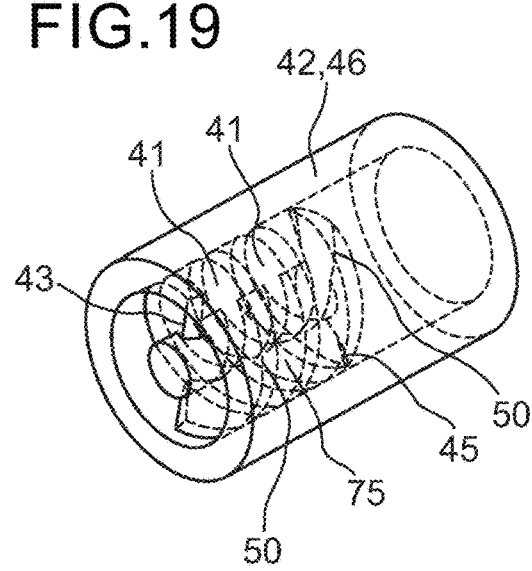

The insert 42 according to FIGS. 18 and 19 corresponds essentially to the insert 42 according to FIGS. 16 and 17, except that the spirals 75 have 1.5 windings 50, such that there is a slope of about 20°.

Figure 20:
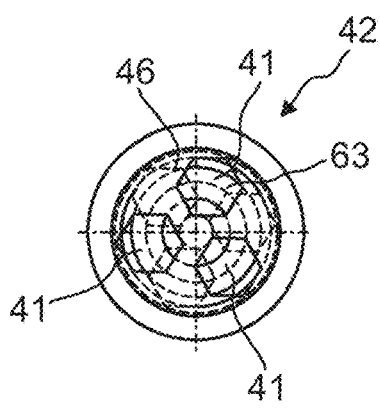
Figure 21:
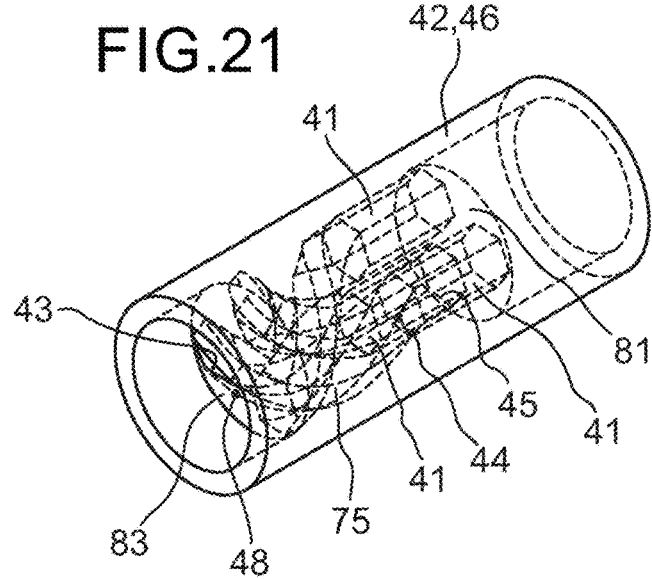

The insert 42 according to FIGS. 20 and 21 is similar to the insert 42 according to FIGS. 12 and 13. There are three ducts 41 each in the form of a spiral 75 which have a greater slope in a first position 44 than in a second position 48. The ducts 41 of the insert 42 according to FIGS. 20 and 21 each partly form a spiral 75, and the first ends 43 of the ducts 41 open into a first end face 83. A further portion of the ducts 41 runs straight and opens by the second end 41 into a second end face 81. In addition, the ducts 41 have a hexagonal cross-sectional area 63.

Figure 22:
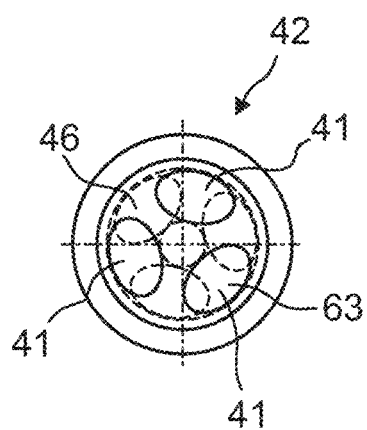
Figure 23:
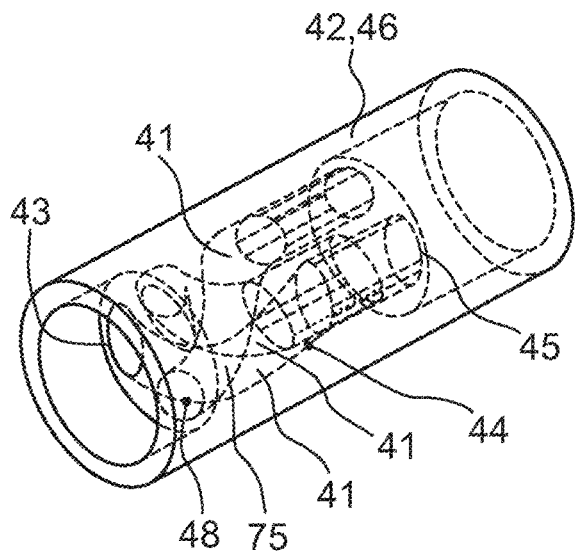
Figure 24:
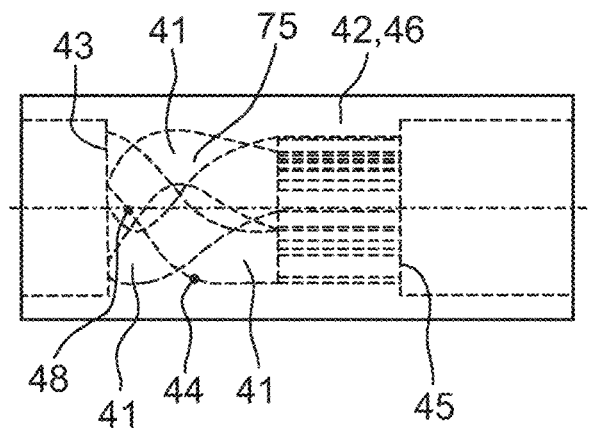
Figure 25:
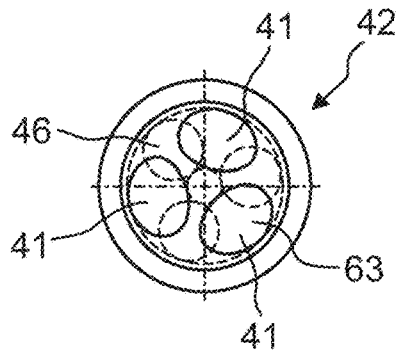
Figure 26:
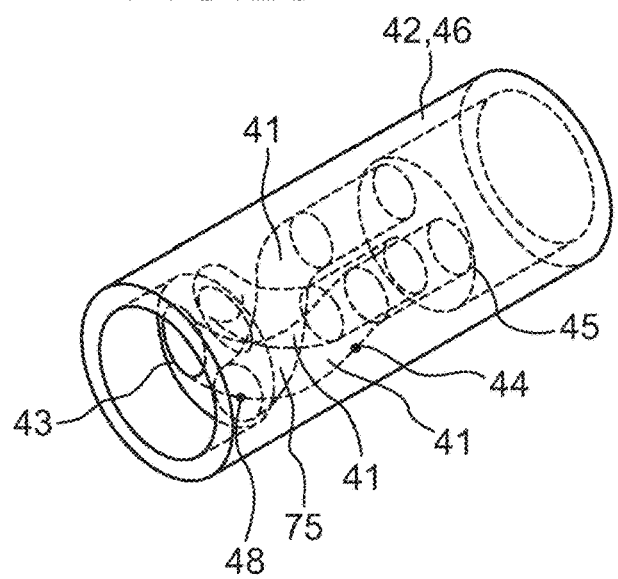
Figure 27:
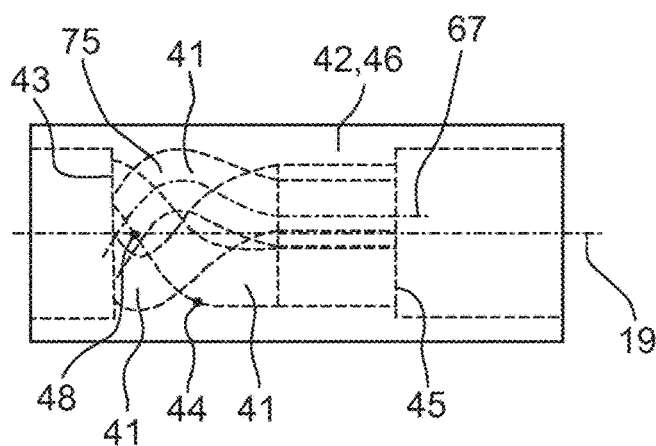

The insert 42 shown respectively in a top view, in perspective view and in a longitudinal section in FIGS. 22, 23 and 24 corresponds essentially to the insert 42 according to FIGS. 25, 26 and 27, except that the ducts 41 have a constant ellipsoidal cross-sectional area 63. By virtue of a constant cross-sectional area 63 as an ellipse, a higher opening ratio in the cross-sectional area 63 is achieved compared to a partly round cross-sectional area 63.

The insert 42 according to FIGS. 25, 26 and 27 corresponds to the insert 42 according to FIGS. 22, 23 and 24, except that the ducts 41 have a variable cross-sectional area 63. The ducts 41 have a round cross-sectional area 63 at the second end 45, and also along the straight portion of the ducts 41. In the spiral 75, the cross-sectional area 63 varies from a round form to a flattened ellipsoidal form since a slope of the center axes 67 of the ducts 41 increases relative to the longitudinal axis 19.

Figure 28:
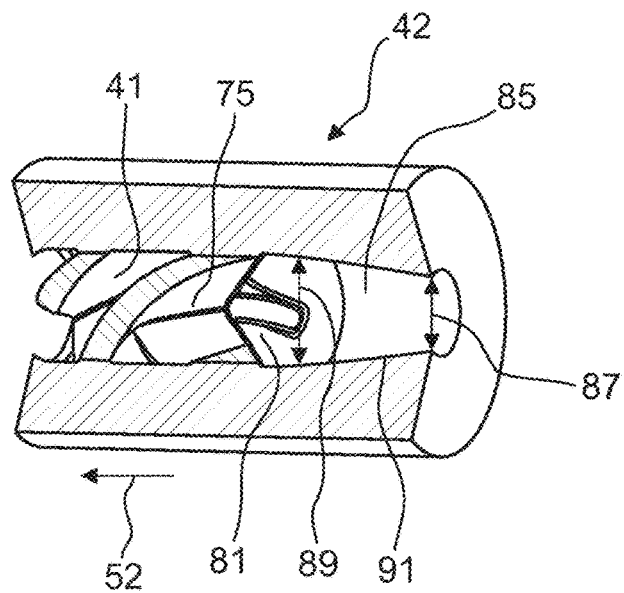

FIG. 28 shows an insert 42 having an undercut 91. The insert 42 comprises three ducts 41, each of which forms a spiral 75 with a variable slope. In the insert 42, an insert melt duct 85 ends at a second end face 81 of the ducts 41 in conveying direction 52. The insert melt duct 85 has the undercut 91, such that a first diameter 87 of the insert melt duct 85 is smaller than a second diameter 89 of the insert melt duct 85 at the second end face 81. Correspondingly, the diameter 87, 89 of the insert melt duct 85 increases in conveying direction 52.

EXAMPLES

Example 1

Production of Bowls

For production of dessert bowls in a hydraulic injection molding machine with a locking force of 1000 kN, comprising a barrel with internal diameter 30 mm, a first amount of a first molding compound was provided for each bowl, i.e. for each shot. The first molding compound consisted of black color pellets that comprised carbon black as black colorant with a concentration of 25% by weight in PBT. The first amount had a mass of 0.03 g.

In addition, a second amount of a further molding compound was provided for each bowl. The second amount had a mass of 55.32 g. The further molding compound comprised 55 g of an uncolored PBT pellet material and 0.32 g of a colored PBT pellet material that comprised a further colorant in concentrated form per second amount. The further molding compound was in the form of a pellet mixture, and the uncolored PBT pellets and the colored PBT pellets were premixed in the further molding compound.

Ten bowls were produced in succession, and so the process was repeated several times.

A first amount of the first molding compound was applied to the screw that was in a backward position, and the empty screw flight of which was visible at the introduction opening. Then the screw was moved into a forward position towards the nozzle for injection.

Subsequent, a second amount of the further molding compound was applied to the screw. The addition of the second amount of the further molding compound was commenced while the screw was in the forward position in the barrel. The screw rotated, and the first molding compound and the further molding compound were plastified until the screw was back in the backward position. When the plastifying had concluded, the rotation of the screw was stopped.

Then a first amount of the first molding compound was again fed to the screw. Then the plastified molding compounds were injected into an injection mold, for which the screw was moved back into the forward position, i.e. advanced. After the injection, a second amount of the further molding compound was again added, and plastification was effected again.

Correspondingly produced bowls showed a comparable marbling pattern, i.e. reproducible marbling.

With the same process procedure, the configuration of the injection molding machine was varied in each case for the production of ten bowls, with reproducible marbling patterns for each configuration. A needle valve nozzle or an open nozzle was used in each case. The nozzle head in each case comprised a single central bore, three straight bores, four straight bores, six straight bores, three ducts each executed as a screw flight, or three ducts each curved in spiral form.

Example 2

Production of Measuring Cups

Multicolor marbled measuring cups were produced in an electrical injection molding machine with locking force 1000 kN, comprising a barrel of internal diameter 40 mm and an open nozzle. The process procedure corresponded essentially to the process procedure of example 1.

For each measuring cup, i.e. for each shot, a first amount of a first molding compound was provided in each case. The first molding compound also consisted of the black color pellets, and the first amount had a mass of 0.07 g.

In addition, a second amount of three further molding compounds was provided for each measuring cup. The second amount was divided into three portions. A first portion of the second amount comprised a second molding compound consisting of 68 g of a PBT pellet material and 0.67 g of a concentrated blue-colored PBT pellet material. A second portion of the second amount comprised a third molding compound consisting of 68 g of a PBT pellet material and 0.67 g of a concentrated green-colored PBT pellet material. A third portion of the second amount comprised a fourth molding compound consisting of 68 g of a PBT pellet material and 0.67 g of a concentrated yellow-colored PBT pellet material. Overall, the molding compounds provided corresponded to the mass of the measuring cup.

A first amount of the first molding compound was applied to the screw that was in a backward position, and the empty screw flight of which was visible at the introduction opening. Then the screw was moved into a forward position toward the nozzle for injection of molding compound already present on the screw.

After the injection and before the commencement of the plastification, the first portion of the second amount was added. After the first third of the total duration of the plastification, the second portion of the second amount was added. The plastification was continued, and the third portion of the second amount was added after the second third of the total duration of the plastification.

After addition of the third portion of the second amount, a first amount of the first molding compound was again added as soon as the screw was no longer in rotation and was in the backward position.

LIST OF REFERENCE NUMERALS 1 first molding compound
3 at least one further molding compound
5 injection unit
6 inlet
7 screw injection molding machine
8 entry opening
9 injection mold
10 gate runner
11 barrel
13 screw
15 screw tip
17 nozzle
19 longitudinal axis
21 forward position
23 backward position
25 distance
27 clear space
29 cavity
31 internal free volume
33 internal volume
35 interior
37 nozzle head
38 passage bore
39 nozzle body
40 exit opening
41 ducts
42 insert
43 first end
44 first position
45 second end
47 metering zone
48 second position
49 compression zone
50 windings
51 intake zone
52 conveying direction
53 feed opening
55 first region
57 second region
59 cover
61 second distance
63 cross-sectional area
65 land
67 center axis
75 spiral
79 solid cylinder
81 second end face
83 first end face
85 insert melt duct
87 first diameter
89 second diameter
91 undercut

The invention claimed is:

1. A process for producing marbled moldings, wherein a first molding compound and at least one further molding compound are injected from an injection unit of a screw injection molding machine into an injection mold, wherein the injection unit comprises a hollow barrel, a screw having a screw tip and a nozzle, and the screw is rotatable and is disposed in the hollow barrel so as to be movable in the direction of the longitudinal axis of the hollow barrel between a forward position and a backward position, with a smaller distance between the screw tip and the nozzle in the forward position than in the backward position, and wherein the first molding compound comprises a first polymer compound and a first colorant, and the at least one further molding compound comprises a further polymer compound and optionally at least one further colorant, comprising the following steps:

a) optionally feeding a first amount of the first molding compound onto the screw when the screw is in the backward position,
b) advancing the screw from the backward position into the forward position,
c) feeding a second amount of the at least one further molding compound onto the screw,
d) plastifying the first molding compound and the at least one further molding compound in the hollow barrel of the screw, with rotation of the screw and conveying of at least a portion of the first molding compound and at least a portion of the at least one further molding compound into a clear space in the hollow barrel between the nozzle and the screw tip, and with the screw moving from the forward position into the backward position,
e) feeding a new first amount of the first molding compound onto the screw when the screw is in the backward position,
f) injecting the first molding compound and the at least one further molding compound from the clear space in the hollow barrel into the cavity of the injection mold, with the screw advancing from the backward position into the forward position,
g) cooling the first molding compound and the at least one further molding compound in the injection mold, so as to give a marbled molding, and
h) removing the marbled molding from the injection mold,
wherein steps c) to h) are repeated, step c) is conducted before step f), and step a) is optionally conducted before step b), and
wherein the feeding of the new first amount of the first molding compound in step e) and optionally the feeding of the first amount of the first molding compound in step a) is conducted separately in time or space from the feeding of the second amount of the at least one further molding compound in step c), and wherein the feeding of the second amount of the at least one further molding compound in step c) is conducted after the advancing in step b).

2. The process according to claim 1, wherein a ratio of a maximum internal free volume of the hollow barrel that can be occupied by the first molding compound and the at least one further molding compound to an internal volume of the cavity is not more than 10.

3. The process according to claim 1, wherein a ratio of the sum of the mass of the first amount of the first molding compound and the mass of the second amount of the at least one further molding compound to the mass of the marbled molding is 0.5 to 1.5, where this ratio is greater than 1 when there is at least one gate in the production of the marbled molding.

4. The process according to claim 1, wherein a mass ratio of the first amount to the second amount is less than 0.1.

5. The process according to claim 1, wherein a ratio of a first concentration of the first colorant in the first molding compound to a further concentration of the at least one further colorant in the at least one further molding compound is more than 20.

6. The process according to claim 1, wherein the first polymer compound and/or the at least one further polymer compound comprise a polymer selected from the group consisting of polypropylene (PP), polyethylene (PE), polyoxymethylene (POM), polyethylene terephthalate (PET), polybutylene terephthalate (PBT), polyamide (PA), polycarbonate (PC), polyarylethersulfones (PSU, PESU, PPSU), thermoplastic polyurethanes (TPU), polybutylene adipate terephthalate (PBAT), polybutylene succinate (PBS), polylactide (PLA), polybutylene sebacate terephthalate (PBSeT), polylactic acid (PLA), polyethylene naphthalate (PEN), polyacrylmethacrylate (PMMA), polystyrene (PS), styrene-containing polymers, acrylonitrile-butadiene-styrene copolymer (ABS), and mixtures thereof.

7. The process according to claim 1, wherein the first molding compound and/or the at least one further molding compound are each fed in in pellet form.

8. The process according to claim 1, wherein a mass ratio of the first amount to the second amount is less than 0.001.

9. The process according to claim 1, wherein a ratio of a first concentration of the first colorant in the first molding compound to a further concentration of the at least one further colorant in the at least one further molding compound is more than 50.

* * * * *